(12) United States Patent
Colombino et al.

(10) Patent No.: US 8,745,068 B2
(45) Date of Patent: Jun. 3, 2014

(54) METHOD FOR VISUAL ASSET REPLACEMENT ACCOUNTING FOR COST, COPYRIGHT, AND CONFIDENTIALITY REQUIREMENTS

(75) Inventors: Tommaso Colombino, Grenoble (FR); Robert John Rolleston, Rochester, NY (US); Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 267 days.

(21) Appl. No.: 12/578,412

(22) Filed: Oct. 13, 2009

(65) Prior Publication Data

US 2011/0087675 A1    Apr. 14, 2011

(51) Int. Cl.
    *G06F 17/30*    (2006.01)
(52) U.S. Cl.
    USPC ............................................. 707/749
(58) Field of Classification Search
    USPC ............................................. 707/749
    See application file for complete search history.

(56) References Cited

U.S. PATENT DOCUMENTS

| 5,530,520 | A  | * | 6/1996 | Clearwater | ........... 399/366 |
| 7,739,307 | B2 |   | 6/2010 | Probst et al. | |
| 7,756,842 | B2 |   | 7/2010 | Blumenau et al. | |
| 2002/0032626 | A1 |   | 3/2002 | DeWolf et al. | |
| 2002/0077986 | A1 |   | 6/2002 | Kobata et al. | |
| 2005/0114784 | A1 | * | 5/2005 | Spring et al. | ........... 715/762 |
| 2005/0137983 | A1 |   | 6/2005 | Bells | |
| 2007/0136680 | A1 | * | 6/2007 | Skrenta | ........... 715/780 |
| 2011/0029561 | A1 | * | 2/2011 | Slaney et al. | ........... 707/772 |

* cited by examiner

*Primary Examiner* — Rehana Perveen
*Assistant Examiner* — Alexander Khong
(74) *Attorney, Agent, or Firm* — MH2 Technology Law Group LLP

(57) ABSTRACT

Systems and methods of replacing digital assets within a multimedia document are provided. The systems and methods include a user workstation that can receive a selection from a user for an original asset in the document to be replaced. Alternative assets can be retrieved that have a level of appropriateness with the selected original asset. Constraints on use of the alternative assets can be determined and a fitness value of each of the alternative assets can be calculated based on the appropriateness and the constraints on use. The alternative assets with the highest fitness values can be presented to the user for the user to select to replace the original asset.

20 Claims, 5 Drawing Sheets

METHOD FOR VISUAL ASSET REPLACEMENT ACCOUNTING FOR COST, COPYRIGHT, AND CONFIDENTIALITY REQUIREMENTS

FIELD OF THE INVENTION

The present embodiments relate to the field of multimedia documents, and more particularly to systems and methods for replacing digital assets in a multimedia document.

BACKGROUND OF THE INVENTION

Considerable time and skill are invested in creating marketing and sales collaterals for use in presentations, sales efforts, promotional materials, and the like. After a set of collaterals is created, companies or other entities may desire to use the finished pieces as samples or examples of the types of designs that the entity produces. However, certain collaterals may contain material or assets which are limited by use licenses or otherwise not appropriate to show customers or clients. For example, the assets may have associated fees, licenses, or confidentiality issues. As such, the reusability and/or visibility of certain collaterals can be limited.

It is sometimes the case that assets with constraints can be replaced with existing alternative assets having similar content to the constrained asset, but with fewer or no constraints. By replacing the constrained asset with an alternative asset, an entity's collateral can be reusable by and/or visible to target audiences because the alternative asset has fewer or no constraints. However, systems and methods of replacing assets in multimedia documents are not implemented. In particular, various challenges can arise with respect to the assurance of the maintenance of a proper aesthetical level of alternative assets and the efficient management of assets in a context sensitive fashion.

A need, therefore, exists to implement systems and methods to replace the licensed, sensitive, or otherwise constrained assets with available alternative samples that a user has a right to use. Further, it is desirable to select alternative assets that are both appropriate to replace the original assets, and with fewer or no constraints.

SUMMARY OF THE EMBODIMENTS

The following presents a simplified summary in order to provide a basic understanding of some aspects of one or more embodiments. This summary is not an extensive overview, nor is it intended to identify key or critical elements of the embodiments nor to delineate the scope of the embodiments. Rather, its primary purpose is merely to present one or more concepts in simplified form as a prelude to the detailed description presented later.

In accordance with the present teachings, a method of replacing digital assets within a multimedia document is provided. The method comprises receiving a selection for an original asset within the multimedia document; and retrieving, from a database, one or more alternative assets based on an appropriateness with the selected original asset. A constraint on the use of each of the retrieved alternative assets is determined, and a fitness value is assigned to each of the retrieved alternative assets based on the appropriateness and the constraint on the use. Finally, one or more of the retrieved alternative assets are provided to a workstation based on the fitness value.

In accordance with the present teachings, a system for replacing digital assets within a multimedia document is provided. The system comprises a workstation configured to receive a selection for an original asset within the multimedia document. The server further comprises a server configured to retrieve, from a database, one or more alternative assets based on an appropriateness with the selected original asset; determine a constraint on the use of each of the retrieved alternative assets; assign a fitness value to each of the retrieved alternative assets based on the appropriateness and the constraint on the use; and provide one or more of the retrieved alternative assets to the workstation based on the fitness value.

BRIEF DESCRIPTION OF THE DRAWINGS

The accompanying drawings, which are incorporated in and constitute a part of this specification, illustrate embodiments and together with the description, serve to explain the principles of the embodiments. In the figures.

It should be noted that some details of the drawings have been simplified and are drawn to facilitate understanding of the inventive embodiments rather than to maintain strict structural accuracy, detail, and scale.

DESCRIPTION OF THE EMBODIMENTS

Reference will now be made in detail to the present and exemplary embodiments, examples of which are illustrated in the accompanying drawings. Wherever possible, the same reference numbers will be used throughout the drawings to refer to the same or like parts.

Various embodiments provide systems and methods that allow a user to replace digital assets within a multimedia document. In particular, the systems and methods allow a user to edit the multimedia document to replace existing digital assets within the document that are limited by constraints or are otherwise inappropriate to show to third parties due to such factors as cost, copyright, confidentiality of content, and the like. Some situations where it may be desirable to replace digital assets are in the dissemination or publication of a previously confidential or restricted document, if a condition of use of the document or part of the document content changes, or if rights to the use of existing visual assets, changes in licensing agreements, and/or costs of existing visual assets expire.

Further, in the creation of collaterals for variable information campaigns, it may be desirable to replace sensitive or controlled assets with neutral or properly redacted samples of the assets. For example, a creator may wish to replace image content, sensitive identifying information, company logos, prices, names, and the like. Pre-existing alternative assets can be retrieved that conform to publication, use, or appropriateness requirements, and substituted in the multimedia document for the original asset. As used herein, the term "asset" can describe any image, picture, and the like contained in a document such as a pamphlet, handout, collateral, and the like. In present embodiments, the asset can be in digital form, either originally or via converting an image into digital form.

The systems and methods of the present embodiments can query a user for an alternative asset and associated requirements. A server can retrieve a set of alternative assets according to the user requirements, wherein each alternative asset has a general notion of appropriateness in relation to the original asset such as, for example, visual similarity, content affinity, or aesthetic affinity. Each alternative asset can have a compliance status with cost, copyright, confidentiality, and other requirements, as well as an associated "fitness" score as based on the appropriateness and compliance status. An optimization technique can be employed to determine the most appropriate alternative assets based on the fitness scores. A set of candidate alternative assets can be presented to the user along with any relevant cost and copyright information.

Figure 1:
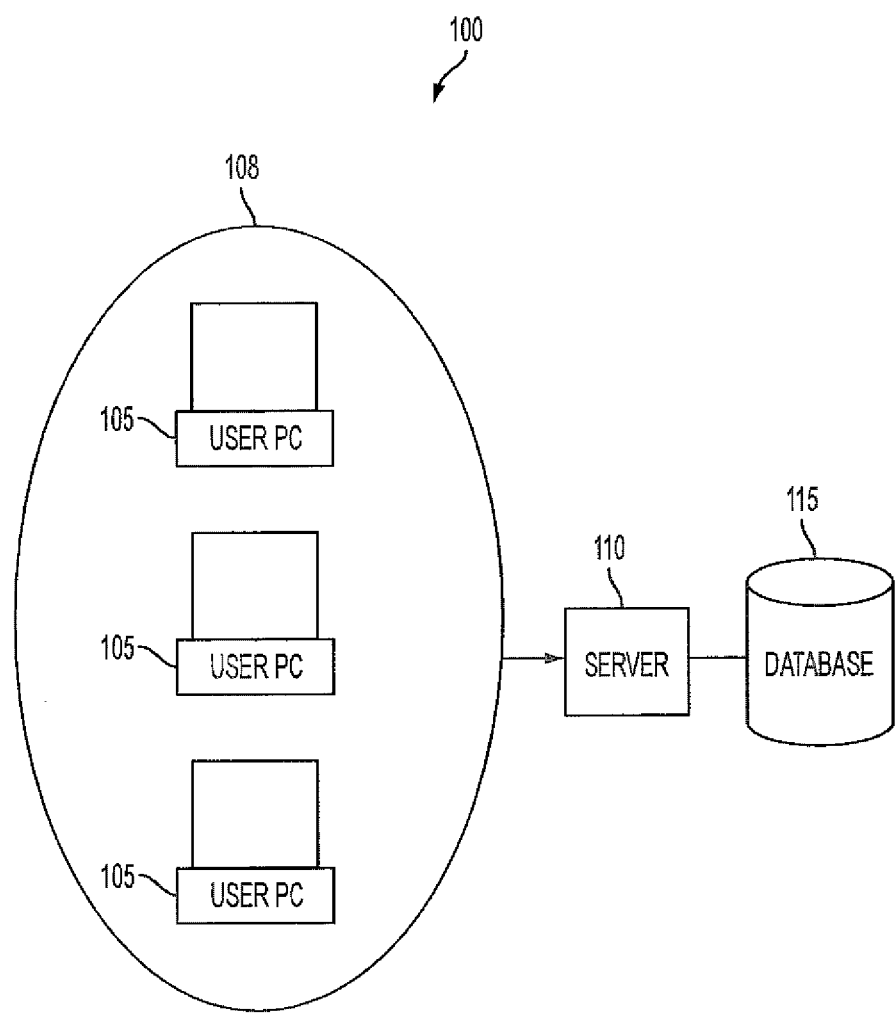
FIG. 1 depicts a block diagram showing an exemplary structure of an asset retrieval system according to the present teachings.

Referring to FIG. 1, depicted is a diagram showing an exemplary structure of an asset retrieval system 100 according to the present embodiments. The system 100 can be configured to, for example, replace digital assets of a multimedia document. Although FIG. 1 shows that the asset retrieval system 100 has multiple components, it should be appreciated that the asset retrieval system 100 can be entirely contained within one application and running within a single instance.

As shown in FIG. 1, one or more workstations or user personal computers (PCs) 105 can be connected to a server 110 via a communication link means such as, for example, an Ethernet or wireless connection. In combination, the user PCs 105 can comprise a network 108 such as the Internet or another public or private network. A user situated at or with access to any of the user PCs 105 can access a multimedia document stored locally on or remotely from the respective user PC 105. For example, the user can access the document via a word processing or similar application. Once the multimedia document is accessed, the user can select to replace specific assets contained in the document. The user can further specify requirements for alternative assets that are to replace the selected assets. For example, the user can enter requirements for cost, copyright, confidentiality, and the like, associated with the alternative asset.

In embodiments, the cost requirement can relate to the cost for the use or any associated licenses of the alternative asset. Further, the copyright requirement can relate to whether the alternative asset has any associated copyright protection. Moreover, the confidentiality requirement can relate to whether the alternative asset is confidential to any particular associated party. The requirements can be entered by the user by, for example, specifying a cost or by selecting a "yes/no" box for each of the herein-mentioned requirements.

The server 110 can be connected to a database 115, however it should be appreciated that the server 110 can be connected to a plurality of databases. The database 115 can store any or all of the multimedia documents, original assets, or alternative assets. The server 110 in combination with the database 115 can be an asset management system such as, but not limited to, a digital asset management (DAM), digital content management (DCM), enterprise content management (ECM), and digital media management (DMM). The system 100 can manage licenses associated with the assets contained therein. Further, other copyright licensing schemes such as, for example, the Creative Commons organization scheme as employed by websites such as Flickr™, can enable creators of assets to specify copyright terms for the sharing of the assets.

In operation, the server 110 can query the database 115 in response to a user accessing a multimedia document and requesting alternative assets as described herein. For example, the server 110 can query the database 115 for stored alternative assets according to requirements specified by the user. Alternative assets can be retrieved from the database 115 according to the query and sent to the server 110. The server 110 can estimate the "fitness" of the retrieved assets to determine the ability of the assets to replace the original asset, according to embodiments described herein. The server 110 can select one or more assets from the retrieved assets to present to the user for selection. The user application can replace the original asset in the multimedia document with the selected alternative asset.

Figure 2:
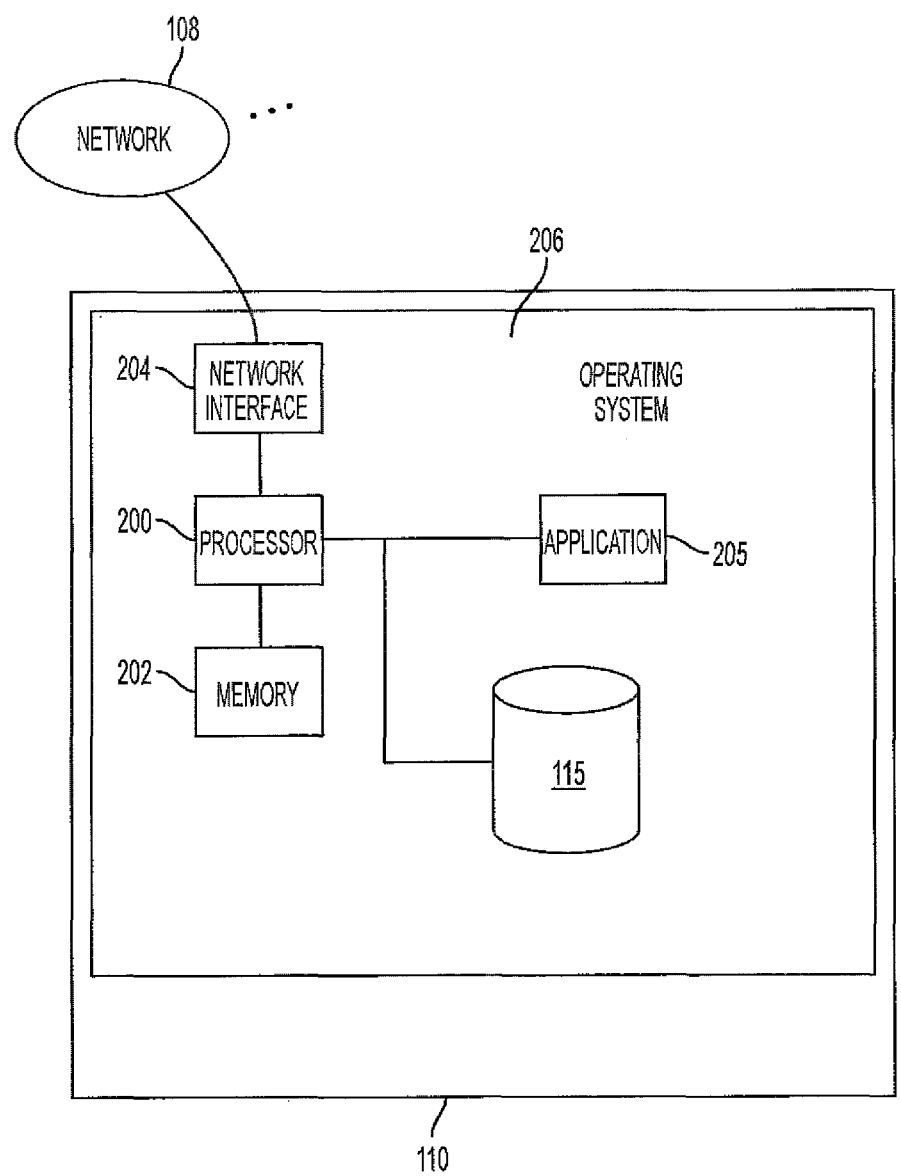
FIG. 2 depicts an exemplary hardware diagram according to present teachings.

FIG. 2 illustrates an exemplary diagram of hardware and other resources that can be incorporated in the server 110 configured to communicate with the network 108, according to embodiments. In embodiments as shown, the server 110 can comprise a processor 200 communicating with memory 202, such as electronic random access memory, operating under control of or in conjunction with an operating system 206. The operating system 206 can be any commercial, opensource, or proprietary operating system or platform. The processor 200 can communicate with the database 115, such as a database stored on a local hard drive. While illustrated as a local database in the server 110, the database 115 can be separate from the server 110, as illustrated with respect to FIG. 1.

The processor 200 can further communicate with a network interface 204, such as an Ethernet or wireless data connection, which in turn communicates with the network 108, such as the Internet or other public or private networks. The processor 200 can also communicate with the database 115 or any applications 205 to execute control logic and perform the asset replacement processes described herein.

While FIG. 2 illustrates the server 110 as a standalone system comprising a combination of hardware and software, the server 110 can also be implemented as a software application or program capable of being executed by a conventional computer platform. For example, it should be understood that the components of the server 110 can be implemented on any of the user PCs 105, as described with respect to FIG. 1, such that the user PCs 105 can communicate directly with the database 115. Likewise, the server 110 can also be implemented as a software module or program module capable of being incorporated in other software applications and programs. In either case, the server 110 can be implemented in any type of conventional proprietary or open-source computer language.

Figure 3:
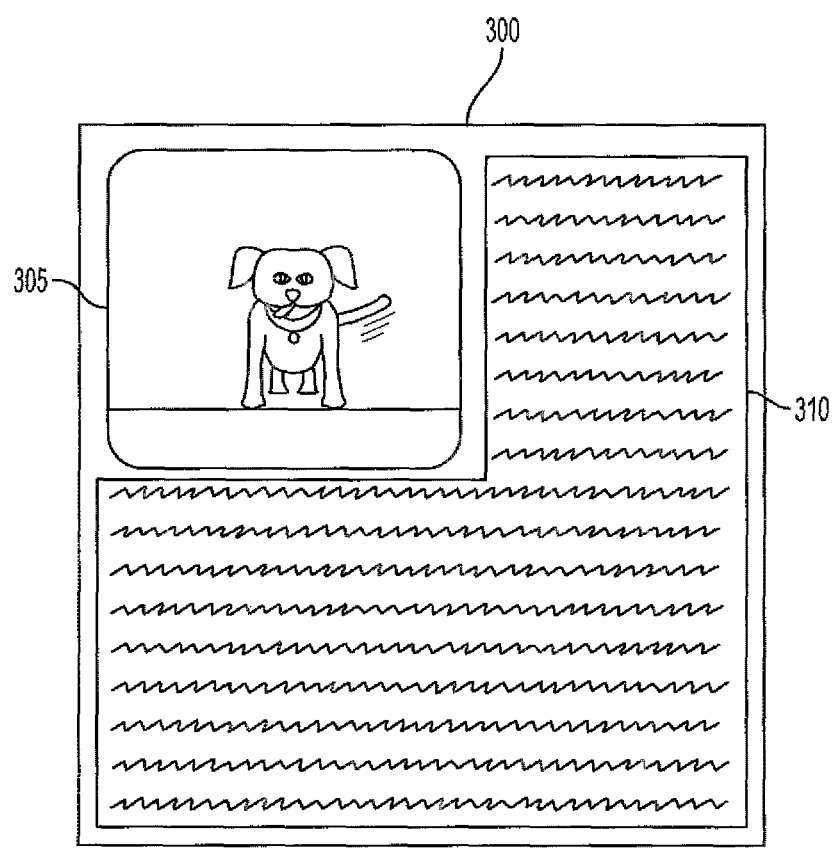
FIG. 3 depicts an exemplary multimedia document according to the present teachings.

FIG. 3 illustrates an exemplary document 300 according to the present embodiments. The document 300 can be a multimedia document accessible through a word processing or other application by a user. The document 300 can be a sales collateral, handout, or the like for use by an entity in presentations, sales efforts, promotional materials, and the like. The document 300 can comprise a digital asset 305 and related text 310. The related text 310 can describe the digital asset 305 or otherwise comprise any text that the creating entity desires to be in the document 300. The digital asset 305 can be any digital image that can be embedded in the document 300. For example, the digital asset 305 can be an image file in a format such as JPEG, Exif, TIFF, RAW, PNG, GIF, BMP, or other image file formats known in the art. It should be appreciated that the document 300 can have any combination or arrangement of size, pages, slides, assets, related text, and the like.

The digital asset 305 can be selectable by a user through a word processing, graphics design, layout, or similar application. In particular, the user can select the digital asset 305 to be replaced by an alternative asset for reasons described herein.

It should be appreciated that the user can select multiple assets to be replaced that can be present in the document 300. In embodiments, a user can select one or more portions of the digital asset 305 to be replaced, whereby the portions can be any size or any shape. The related text 310 can be resized or reformatted if the selected alternative asset is a size different from that of the digital asset 305. Further, any or all parts of the selected alternative asset can be merged with any or all parts of the digital asset 305. The user can select the digital asset 305 through the accessing application or other applications, or via conventional means known in the art.

Figure 4:
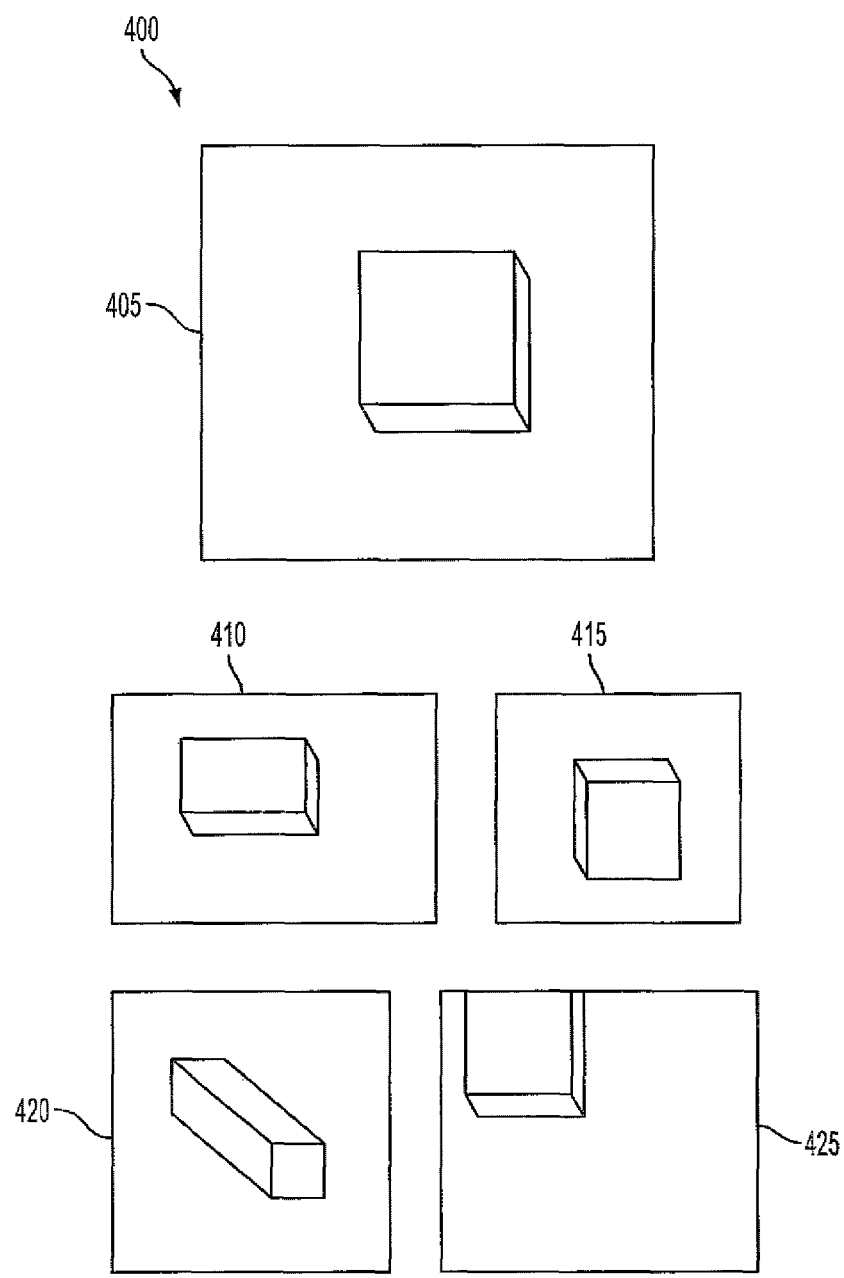
FIG. 4 depicts an exemplary original asset and a set of potential alternative assets according to the present teachings.

FIG. 4 illustrates an exemplary original asset and a set of potential alternative assets. In particular, FIG. 4 illustrates a series 400 of images having visual similarity. The series 400 can comprise an original image 405 that can be an image selected by a user to be replaced within a multimedia document, according to embodiments described herein. The series 400 can further comprise alternate images 410, 415, 420, and 425. In embodiments, the alternate images 410, 415, 420, and 425 can be those retrieved to potentially replace the original image 405, according to embodiments described herein. It should be appreciated that the images 405, 410, 415, 420, and 425 are merely exemplary and can depict any subject. It should further be understood that there can be any number of alternate images.

An alternate image can be considered visually similar to an original image if the images have structural and chromatic similarity. For example, structural similarity can refer to the similarly of shapes and sizes of subject matter contained in the images, and chromatic similarity can refer to the similarity of the colors of the subject matter contained in the images. In embodiments, attributes relating to the structural and chromatic components of each and every image can be determined, quantified, and stored, for example in metadata associated with the image. For example, an image can have an associated red-green-blue (RGB) color model to represent the image's chromatic component. In embodiments, the components of the image can be input by one or more users or can be automatically determined by, for example, image recognition software. Other embodiments can comprise applications which perform image classification, clustering, organizing, and/or the like.

In further embodiments, a threshold value can be set whereby an alternate image can be said to be visually similar to an original image if a difference between the structural and/or chromatic components of the alternate image and the original image is below the threshold value. The threshold value can be set by a user or automatically set depending on, for example, the management system employed.

As shown in FIG. 4, the exemplary original image 405 depicts a 3-D image of a square-shaped figure. The alternate images 410, 415, 420, and 425 each depict a slight variation of the 3-D image depicted in the original image 405. It should be understood that, although not shown in FIG. 4, the images 405, 410, 415, 420, and 425 can have associated colors. Depending on the threshold value set for visual similarity components, for example structural and chromatic similarity, the images depicted in alternate images 410, 415, 420, and 425 may or may not be said to be visually similar to the image depicted in the original image 405. Because the alternate images 410, 415, 420, and 425 can represent the retrieved images offered to replace the original asset, the user can select one of the alternate images 410, 415, 420, and 425 via conventional means.

Alternate images can further be appropriate to replace original images in a document if there exists content and/or aesthetic affinity between the alternate image and the original image. With regards to content affinity, if the content contained in the original image is what is important to a user, then an alternate image depicting similar content to what is depicted in the original image can be said to have content affinity with the original image. For example, if an original image depicts a dog, and the user is concerned with finding an alternate image depicting a dog but is not concerned with the type of dog, then an alternate image depicting a different type of dog from that depicted in the original image can be said to have content affinity with the original image. Attributes relating to the content of an image can be determined, quantified, and stored along with the image, for example as tags in metadata. In embodiments, the content of the image can be input by one or more users or can be automatically determined by, for example, image recognition software.

With regards to aesthetic affinity, the color palate of the original image is the most important feature, and the actually content of the image is irrelevant. For example, if the original image is predominately red, then an alternate image containing a similar shade of red can be said to have aesthetic affinity with the original image. In embodiments, other specific aesthetic elements can be considered, such as, for example, repetitive patterns, textures, histograms, spatial frequency content, and the like. Attributes relating to the aesthetic features of an image can be determined, quantified, and stored along with the image, for example as tags in metadata. In embodiments, the aesthetic features of the image can be input by one or more users or can be automatically determined by, for example, image recognition software.

In embodiments, threshold values and/or matching algorithms can be set and/or implemented whereby an alternate image can be said to have content and/or aesthetic affinity with an original image if a difference between the relevant components of the alternate image and the original image is below the threshold value, and/or the metadata of the alternate image closely matches that of the original image. The threshold values and matching algorithms can be set or programmed by a user, or automatically set or programmed depending on, for example, the management system employed. It should be appreciated, however, that other systems and methods can be used to determine content and aesthetic affinity.

Figure 5:
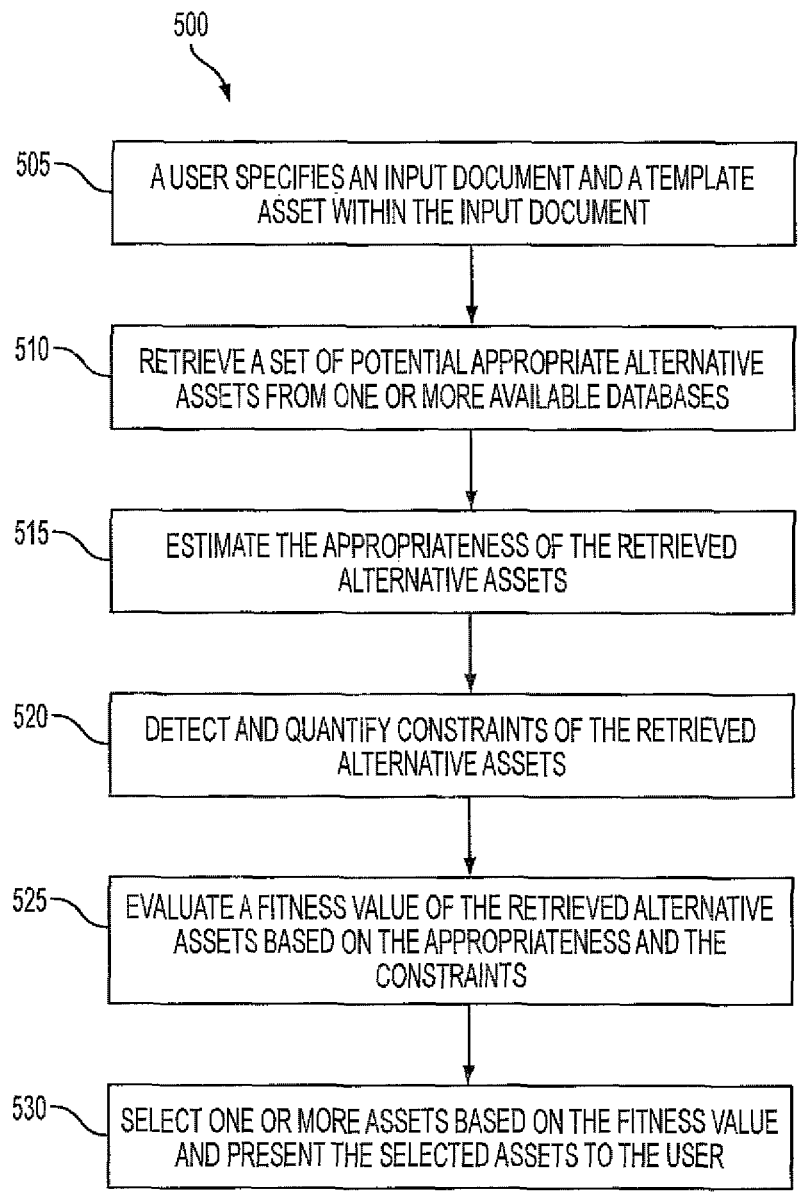
FIG. 5 depicts an exemplary flow diagram of replacing an asset in a multimedia document according to the present teachings.

Referring to FIG. 5, an embodiment for an exemplary method 500 for replacing digital assets within a multimedia document is depicted. It should be appreciated that the mechanical and electronic components of a PC, server, and/or another computing machine can perform the steps of method 500.

The method 500 assumes that a user has specified which template asset ($k_0$) to replace within a document. The goal of method 500 is to find an alternative asset (k) to replace $k_0$ such that:

$$f(k_0) < f(k), \text{ with } k \text{ as the subset of asset databases} \quad [1]$$

where f is a value indicating how the alternative asset "fits" the required purpose within the document, and where the asset databases store alternative assets that are to replace those within the document. In embodiments, a fitness of the alternative asset can vary in relation to visual appropriateness of the asset as well as user requirements, and can be constrained by the eventual restrictions on the use of the asset such as copyright, confidentiality, licenses, and the like.

In 505, a user specifies an input document and a template asset ($k_0$) within the input document. For example, the user can access a multimedia document from a user PC and specify a digital asset within the document to be replaced by an alternative asset. In embodiments, the user can specify requirements for the alternative asset. For example, the user can enter requirements for cost, copyright, confidentiality, and the like. For further example, the user can specify the type of appropriateness desired in the alternative image such as, for example, visual similarity, content affinity, and/or aesthetic affinity.

In 510, a set of potential appropriate alternative assets with a defined cardinality is retrieved from one or more available databases. In embodiments, the cardinality can be the number of alternative assets retrieved, such as, for example, a number between 1 and 100, and can be a user-specified or pre-defined value. Further, in embodiments, a server can retrieve the assets from a database such as an in-house database, a third party photo stock set, an unstructured repository on the Internet, or other databases. In 515, the appropriateness of the retrieved alternative assets is estimated. The appropriateness of the potential alternative assets can be based on visual similarity, content affinity, aesthetic affinity, or other factors, between the template asset and the retrieved alternative assets. In embodiments, the components used to calculate the visual similarity, content affinity, and aesthetic affinity between assets can be present in metadata tags associated with the assets. Visual similarity, content affinity, and aesthetic affinity can be calculated and determined based on threshold values or matching algorithms, as described herein.

In 520, the constraints of the retrieved alternative assets can be detected and quantified. In embodiments, various typologies of constraints can be considered such as, for example, the rights of use, the confidentiality level, any fees associated with the rights of use, and other constraints. Generally, the rights of use can relate to associated copyrights and/or licensing terms of the assets. Management systems such as digital asset management (DAM), digital content management (DCM), enterprise content management (ECM), digital media management (DMM), and others can manage licenses associated with the assets contained therein. Further, other copyright licensing schemes such as, for example, the Creative Commons organization scheme as employed by websites such as Flickr™, can enable creators of assets to specify copyright terms for the sharing of the assets. For example, creators can specify that their works are "all rights reserved" or "some rights reserved." In embodiments, if a creator specifies that an asset has "some rights reserved." then the user can specify that the asset can be shared alike; or require that there be attribution, use for noncommercial purposes, or that there be no derivative works.

The confidentiality level constraint can apply if the asset is contained in an in-house repository. For example, the confidentiality level of the asset can be specified by a user and can be stored as metadata along with the asset in a digital asset management system. The fee constraint can apply in editorial and creative photo repositories like the websites such as Reuters.com™, Corbis.com™, Shutterphoto.com™, and others, that apply fees to assets in relation to different features such as resolution, quality, color, and other features. Generally, the more desirable the features are, the more fees that will apply.

The constraints can be estimated automatically or manually. In cases of a structured database (e.g. Flickr™), the constraints can be estimated by inspecting metadata associated with assets, such as, for example, metadata indicating the right of use of the asset. For example, the right of use of an asset can be specified with an integer between 1 and 4 corresponding to which Creative Common license rights are protecting the image (e.g. free to share, attribution, noncommercial, no derivative works). In cases of unstructured databases, more complex techniques involving determining the asset constraints can be applied. For example, a quantitative value "c(k)" can be estimated by the equation $$c(k)=[c_1,c_2,c_3] \quad [2]$$

wherein $c_1$, $c_2$, and $c_3$ can respectfully correspond to rights, confidentiality, and fee constraints as described herein. The value of $c_1$, $c_2$, and $c_3$ can be discrete or binary, and can be normalized between 0 and 1. C(k) can be any function of $c_1$, $c_2$, and $c_3$, depending on user input or other factors. In embodiments, if for some asset "k," if one or more constraints are not detected or are not available, then the corresponding constraint value can be set to a default value.

In 525, a fitness value of the retrieved alternative assets can be evaluated based on the appropriateness and the constraints of the retrieved alternative assets. In embodiments, a fitness value can be estimated for all of the retrieved assets ("K") to determine if there are assets that can be considered as a better alternative to the template asset $k_0$. In embodiments, the fitness value can be estimated by evaluating and weighing the appropriateness and the constraints of the retrieved assets. For example, the fitness value for a set of retrieved assets can be a constrained optimization formula defined by the equation:

$$f(k)=\max_{k(subset)K} a(k|k_0)_{subject\ to\ the\ constraints\ c(k)} \quad [3]$$

where $a(k|k_0)$ is the appropriateness score and c(k) and the set of constraints for a given asset k. A resulting set of assets achieving the highest fitness score can be determined using [3]. It should be appreciated that the fitness score can be determined by any algorithm, and by balancing or weighing the appropriateness and constraints of the assets with varying importance. The determination can be manually influenced based on inputs from the user or automatically determined by the system based on default values.

In 530, one or more assets can be selected based on the fitness value and presented to the user. In embodiments, each asset k satisfying [1] in combination with [3] can be selected, ordered according to the corresponding fitness value, and presented to the user. In embodiments, the user can specify how many assets will be selected presented, or a default value can be used. In embodiments, the selected assets can be presented to the user via a display monitor, GUI, or other components known in the art. The user can select the replacement asset judged to be the more appropriate for the document. In embodiments, the asset with the highest fitness value can be automatically selected. Upon selection, the replacement asset can replace the original template asset.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

While the embodiments have been illustrated with respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A method of replacing digital assets within a multimedia document, comprising:
   receiving a selection for an original asset within the multimedia document;
   retrieving, from a database, one or more alternative assets, wherein the one or more alternative assets are a same media type as the selected original asset;
   calculating an appropriateness value of each of the one or more alternative assets based on the original asset, wherein the one or more alternative assets are a same media type as the selected original asset;
   calculating a constraint of permissive use value of each of the one or more alternative assets, wherein the constraint of permissive use value is a function of a licensing restriction value, a confidentiality restriction value, and a cost of use value of the one or more alternative assets;
   assigning a fitness value to each of the one or more alternative assets based on the appropriateness value and the constraint of permissive use value; and
   providing one or more of the one or more alternative assets to a workstation based on the fitness value.

2. The method of claim 1, wherein the licensing restriction value, the confidentiality restriction value, and the cost of use value are calculated based on metadata associated with each of the one or more alternative assets.

3. The method of claim 1, wherein the step of providing one or more of the one or more alternative assets to the workstation based on the fitness value comprises providing alternative assets that have a higher fitness value than a fitness value of the original asset.

4. The method of claim 1, wherein the appropriateness value is calculated based on one or more of visual similarity, content affinity, and aesthetic affinity between the one or more alternative assets and the original asset.

5. The method of claim 1, wherein the step of receiving the selection for the original asset within the multimedia document comprises receiving a requirement for a type of restriction of use and a type of appropriateness of the one or more alternative assets.

6. The method of claim 1, wherein the appropriateness value of the one or more alternative assets is calculated based on metadata associated with each of the one or more alternative assets.

7. A method of replacing digital assets within a multimedia document, comprising:
   receiving a selection from a user for an original asset within the multimedia document;
   receiving, from a database, one or more alternative assets, wherein the one or more alternative assets are a same media type as the original asset;
   calculating an appropriateness value of each of the one or more alternative assets based on the original asset, wherein the one or more alternative assets are a same media type as the selected original asset;
   calculating a constraint of permissive use value of each of the one or more alternative assets, wherein the constraint of permissive use value is a function of a licensing restriction value, a confidentiality restriction value, and a cost of use value of the one or more alternative assets;
   calculating a fitness value for each of the one or more alternative assets based on the appropriateness value and the constraint of permissive use value; and
   providing one or more of the one or more alternative assets to the user based on the fitness value.

8. The method of claim 7, further comprising:
   receiving a selected alternative asset, wherein the selected alternative asset is selected by the user from the one or more of the one or more alternative assets provided to the user; and
   replacing the original asset with the selected alternative asset.

9. The method of claim 7, wherein the licensing restriction value, the confidentiality restriction value, and the cost of use value are calculated based on metadata associated with each of the one or more alternative assets.

10. The method of claim 7, wherein the step of providing one or more of the one or more alternative assets to the user based on the fitness value comprises providing alternative assets that have a higher fitness value than a fitness value of the original asset.

11. The method of claim 7, wherein the appropriateness value is calculated based on one or more of visual similarity, content affinity, and aesthetic affinity between the one or more alternative assets and the original asset.

12. The method of claim 7, wherein the appropriateness value of the one or more alternative assets is calculated based on metadata associated with each of the one or more alternative assets.

13. A system for replacing digital assets within a multimedia document, comprising:
   a workstation configured to receive a selection for an original asset within the multimedia document; and
   a server configured to retrieve, from a database, one or more alternative assets, wherein the one or more alternative assets are a same media type as the original asset; calculate an appropriateness value of each of the one or more alternative assets based on the original asset, wherein the one or more alternative assets are a same media type as the selected original asset; calculate a constraint of permissive use value of each of the one or more alternative assets, wherein the constraint of permissive use value is a function of a licensing restriction value, a confidentiality restriction value, and a cost of use value of the one or more alternative assets; assign a fitness value to each of the one or more alternative assets based on the appropriateness value and the constraint of permissive use value; and provide one or more of the one or more alternative assets to the workstation based on the fitness value.

14. The system of claim 13, wherein the licensing restriction value, the confidentiality restriction value, and the cost of use value are determined from metadata associated with each of the one or more alternative assets.

15. The system of claim 13, wherein the appropriateness value is calculated based on one or more of visual similarity, content affinity, and aesthetic affinity between the one or more alternative assets and the original asset.

16. The system of claim 13, wherein the workstation is further configured to receive a requirement for a type of restriction of use and a type of appropriateness of the one or more alternative assets.

17. The system of claim 13, wherein the appropriateness value of the one or more alternative assets is calculated based on metadata associated with each of the one or more alternative assets.

18. The method of claim 2, wherein the licensing restriction value, the confidentiality restriction value, and the cost of use value are further calculated based on user specified requirements of permissive use.

19. The method of claim 9, wherein the licensing restriction value, the confidentiality restriction value, and the cost of use value are further calculated based on user specified requirements of permissive use.

20. The system of claim 14, wherein the licensing restriction value, the confidentiality restriction value, and the cost of use value are further calculated based on user specified requirements of permissive use.

* * * * *